(12) United States Patent
Yoon et al.

(10) Patent No.: US 10,048,784 B2
(45) Date of Patent: Aug. 14, 2018

(54) COVER WINDOW FOR TOUCH SCREEN PANEL FORMED WITH PRINTING LAYER AND METHOD FOR FORMING PRINTING LAYER ON COVER WINDOW FOR TOUCH SCREEN PANEL

(71) Applicant: LG Chem, Ltd., Seoul (KR)

(72) Inventors: Chan-Oh Yoon, Cheongju-si (KR); Jang-Soon Kim, Seongnam-si (KR); Sle Lee, Incheon (KR); Doo-Ho Yang, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/025,887

(22) PCT Filed: May 14, 2015

(86) PCT No.: PCT/KR2015/004845
§ 371 (c)(1),
(2) Date: Mar. 29, 2016

(87) PCT Pub. No.: WO2015/174756
PCT Pub. Date: Nov. 19, 2015

(65) Prior Publication Data
US 2016/0239118 A1    Aug. 18, 2016

(30) Foreign Application Priority Data

May 15, 2014   (KR) .................. 10-2014-0058272

(51) Int. Cl.
*B32B 3/00*     (2006.01)
*G06F 3/041*    (2006.01)
*B41M 5/025*    (2006.01)

(52) U.S. Cl.
CPC ............. *G06F 3/041* (2013.01); *B41M 5/025* (2013.01); *G06F 2203/04103* (2013.01)

(58) Field of Classification Search
CPC .................. B41M 5/025; G06F 3/041; G06F 2203/04103
See application file for complete search history.

(56) References Cited

U.S. PATENT DOCUMENTS

2013/0280463 A1* 10/2013 On ........................ B32B 3/10
428/38
2014/0028928 A1    1/2014 Yu et al.
(Continued)

FOREIGN PATENT DOCUMENTS

KR    20120066272 A    6/2012
KR    101350428 B1     1/2014
(Continued)

OTHER PUBLICATIONS

International Search Report dated Jul. 14, 2015 corresponding to International Application No. PCT/KR2015/004845.
(Continued)

*Primary Examiner* — Elizabeth E Mulvaney
(74) *Attorney, Agent, or Firm* — Lerner, David, Littenberg, Krumholz & Mentlik, LLP

(57) ABSTRACT

The present invention provides a cover window for a touch screen panel, wherein a printing layer is formed at an edge of the transfer substrate film, and an area where the printing layer is not formed is removed from the transfer film, which forms a view area in the cover window substrate.

6 Claims, 6 Drawing Sheets

(56) References Cited

U.S. PATENT DOCUMENTS

| | | | | |
|---|---|---|---|---|
| 2015/0103271 A1* | 4/2015 | Lee | ................... | G06F 3/044 349/12 |
| 2015/0104600 A1* | 4/2015 | Jeon | ................... | G06F 1/16 428/38 |
| 2015/0130763 A1* | 5/2015 | Park | ................... | G06F 3/041 345/174 |
| 2016/0139696 A1* | 5/2016 | Kim | ................... | G06F 3/041 345/173 |

FOREIGN PATENT DOCUMENTS

| KR | 20140022532 A | 2/2014 |
|---|---|---|
| KR | 20140030727 A | 3/2014 |
| KR | 20140035568 A | 3/2014 |
| KR | 20140045149 A | 4/2014 |
| WO | 2013048122 A2 | 4/2013 |

OTHER PUBLICATIONS

Extended search report from European Application No. 15792028.1, dated Apr. 13, 2017.

* cited by examiner (a)

(d)

A cross section

B cross section (e)

A cross section

B cross section

COVER WINDOW FOR TOUCH SCREEN PANEL FORMED WITH PRINTING LAYER AND METHOD FOR FORMING PRINTING LAYER ON COVER WINDOW FOR TOUCH SCREEN PANEL

TECHNICAL FIELD

The present invention relates to a cover window for a touch screen panel formed with a printing layer and a method for forming a printing layer on the cover window for the touch screen panel.

BACKGROUND ART

Recently, electronic devices such as mobile communication terminals and vehicle navigators have formed a large market. Technical goals sought for such electronic devices may include slim design, lightweight design, low power consumption design, high resolution design and high illumination design.

For electronic devices provide with a touch screen or a touch panel switch in an input manipulation unit, a transparent conductive plastic film is used to implement lightweight and anti-fracture design. For example, a polyethylene terephthalate (PET) film is used as a substrate, and a conductive layer formed of, for example, indium tin oxide (ITO) is formed on one surface of the film. The film is laminated to conductive glass, a reinforcing member or a decorative film through an adhesive layer.

DISCLOSURE

Technical Problem

It is an aspect of the present invention to provide a cover window which may implement a printing layer of various colors and effects and be mass-produced for a touch screen panel.

It is another aspect of the present invention to provide a method for forming a printing layer on a cover window which may implement the printing layer of various colors and effects and be mass-produced for a touch screen panel.

Technical Solution

In accordance with one aspect of the present invention, a cover window for a touch screen panel is provided, wherein a printing layer is formed at an edge of a cover window substrate, wherein the printing layer is attached to the cover window substrate thereabove through a medium of an adhesive film layer.

The printing layer may be formed using a transfer method.

The ink may be applied onto a separate transfer substrate, and transferred to the cover window substrate such that the cover window formed with the printing layer is fabricated.

The adhesive film layer has a thickness enforcing adhesive force which enables transfer of the printing layer by making adhesiveness between the adhesive film layer and the cover window substrate higher than adhesiveness between other separately prepared substrate and the printing layer, and the adhesive film layer is formed on a printing layer formed on the another separately prepared substrate and transferred.

A thickness of the adhesive film layer may be 100 to 500% of a thickness of the printing layer.

A thickness of the adhesive film layer may be in a range of 10 µm to 100 µm.

A thickness of the printing layer may be in a range of 5 µm to 75 µm.

The cover window for a touch screen panel makes a distinction between a bezel area and a view area, wherein an area of the cover window substrate with the printing layer formed therein is defined as a bezel area, and an area of the cover window substrate without the printing layer formed therein is defined as a view area, wherein an upper portion of the cover window substrate in the view area may be an open space.

That is, the printing layer is not formed in an upper portion having a thickness ranging from the adhesive film layer to the printing layer of the bezel area on the basis of a surface of the cover window substrate.

The cover window substrate may be a transparent plastic film replacing glass or tempered glass.

The printing layer may include one selected from among black ink, white ink, pink ink and a combination thereof.

In accordance with another aspect of the present invention, a method for forming a printing layer on a cover window for a touch screen panel includes:

applying ink onto a transfer substrate film and forming the printing layer;

forming a transfer film by forming an adhesive film layer on an upper portion of the transfer substrate film such that the printing layer is buried;

removing a predetermined area of the transfer film to define a view area;

attaching the transfer film to a cover window substrate such that the adhesive film layer contacts the cover window substrate thereabove; and removing the transfer substrate film, transferring the printing layer to the cover window substrate through a medium of the adhesive film layer, and fabricating the cover window for touch screen panel by attaching the printing layer to the cover window substrate through a medium of the adhesive film layer while defining the view area.

A release film layer may be formed on an upper portion of the adhesive film layer to protect the adhesive film layer, and the transfer film may be attached after the release film layer is removed shortly before attaching the adhesive film layer to be in contact with the cover window substrate thereabove.

The printing layer may be formed at an edge of the transfer substrate film, and an area where the printing layer is not formed is removed from the transfer film, which forms a view area in the cover window substrate.

Advantageous Effects

According to embodiments of the present invention, a printing layer of various colors and effects may be implemented on a cover window for a touch screen panel and mass-produced using a method for forming the printing layer on the cover window.

BEST MODE

Figure 1:
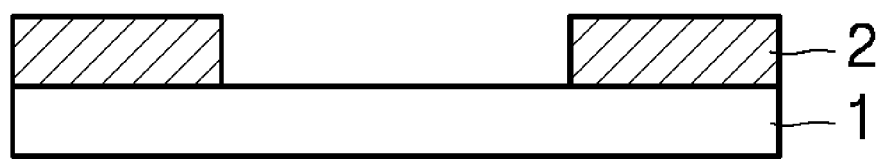
FIGS. 1 to 6 are diagrams schematically illustrating steps (a) to (e) of a method for forming a printing layer on a cover window for touch screen panel according to an embodiment of the present invention.

Hereinafter, embodiments of the present invention will be described in detail with reference to the accompanying drawings. It should be understood that the present invention is not limited to the following embodiments. The scope of the invention should be defined only by the accompanying claims and equivalents thereof.

To clarify the present invention, parts irrelevant to the description will be omitted. Wherever possible, the same reference numbers will be used throughout the drawings to refer to the same or like parts.

In the drawings, layers and areas are shown with thicknesses thereof increased to clearly show the layers and areas. In addition, for simplicity, thicknesses of some layers and areas are exaggerated.

In the following description, stating that an element is formed to on "an upper portion (or lower portion) of a substrate or "over (or under)" the substrate not only means that the element is directly formed on the upper surface (or lower surface) of the substrate, but also means that another element may be provided between the substrate and the element formed the over (or under) the substrate.

According to one embodiment of the present invention, a cover window for a touch screen panel, wherein a printing layer is formed at the edge of a cover window substrate, and is attached to the cover window substrate thereabove through a medium of an adhesive film layer, is provided.

During fabricating a lamination structure of a touch screen panel of a display device such as a mobile device and a Tablet PC, the printing layer is interposed in between the lamination structure at the edge of the touch screen panel to define a bezel area, and a screen is formed in the area inside the bezel area as a view area.

Conventionally, the bezel area is formed by forming a printing layer directly on the inner surface of a cover window which is formed as an external input unit of the lamination structure of the touch screen panel. For the cover window, tempered glass is usually used. However, if the bezel area is formed by forming a printing layer by applying ink directly onto the tempered glass, it is difficult to implement various colors and to mass produce goods in terms of processing.

To the contrary, the cover window for a touch screen panel may form a printing layer by a film handling process while forming the printing layer on the cover window for touch screen panel using a transfer technique, and thus, the printing layer may realizes various colors, or other various effects using a various techniques with minimized process constraints. The cover window for touch screen panel is fabricated by transforming the printing layer, which is prepared in advance, onto the cover window substrate. The cover window for the touch screen panel formed with the printing layer as described above overcomes process constraints due to handling of tempered glass for the cover window substrate, and accordingly, the cover window for the touch screen panel may realize various colors and mass production, compared to cases when it is produced through the direct handling process of the tempered glass.

Specifically, the cover window for touch screen panel provided with the printing layer may be fabricated by transferring the printing layer that is formed through applying ink onto a separate transfer substrate to the cover window substrate.

To transfer the printing layer to the cover window substrate, an adhesive film layer is formed on the upper portion of the printing layer, and the printing layer is attached to the cover window through a medium of the adhesive film layer. Thereby, for the cover window for touch screen panel, the adhesive film layer is disposed between the printing layer and the cover window substrate and mediates them to be bonded together. In this case, it is an advantage that the adhesive film layer may be formed to be thin.

The adhesive film layer is formed to have a thickness enforcing adhesive force which enables transfer of the printing layer by making adhesiveness between the adhesive film layer and the cover window substrate higher than adhesiveness between other separately prepared substrate and the printing layer, as long as the thickness is properly formed so as to enable the adhesive film layer to support the printing layer. Specifically, the thickness of the adhesive film layer may be in a range of about 25 μm to about 300 μm. More specifically, the thickness may be in a range of about 50 μm to about 100 μm.

Accordingly, once the adhesive film layer is given with a thickness enforcing the aforementioned adhesive force, the adhesive film layer, which is formed on the printing layer formed on another substrate prepared separately, is transferred to the cover window substrate.

The adhesive film layer may be fabricated by applying a commonly known adhesive or adhesive film. Commonly known compositions may be unlimitedly used to fabricate an optically clear adhesive layer (OCA). For example, acrylic adhesive may be used to fabricate the adhesive film layer.

According to one embodiment, the thickness of the adhesive film layer may be about 100% to about 500% of the thickness of the printing layer. With the adhesive film layer having a thickness in the aforementioned range, the transfer operation for the printing layer can be implemented and the cover window for touch screen panel provided with the printing layer may be fabricated to be thin.

For example, the thickness of the adhesive film layer may be in a range of about 10 μm to about 100 μm. With the adhesive film layer having a thickness in this range, the transfer operation for the printing layer can be implemented and the cover window for touch screen panel provided with the printing layer may become thin.

The thickness of the printing layer is not limited to the aforementioned examples. For example, the printing layer may be formed to have a thickness of about 5 μm to about 75 μm. Forming the printing layer to have a thickness in this range may facilitate the transfer operation for the printing layer and realize a thin cover window for touch screen panel provided with the printing layer.

The cover window for touch screen panel provided with the printing layer makes a distinction on the cover window substrate between a bezel area, which is defined to be an area where the printing layer is formed, and a view area, which is defined as an area where the printing layer is not formed.

For the cover window for touch screen panel provided with the printing layer, an upper portion of the cover window substrate in the view area is an open space. In this case, the said upper portion of the cover window substrate in the view area may be an upper zone having a thickness equal to the thickness covering the layers from the adhesive film layer to the printing layer in the bezel area on the basis of the surface of the cover window substrate, and it may be formed as an open space as the printing layer is not formed therein.

The cover window substrate may be formed of a transparent plastic film replacing glass or of tempered glass. As mentioned above, the cover window for touch screen panel provided with the printing layer may employ tempered glass as the cover window substrate to embody the printing layer of various colors and it may be mass-produced.

The printing layer may be formed of a material coming in various colors including black ink, white ink and pink ink. The printing layer may be formed using a common known material according to a commonly known method. For example, to form the printing layer, a composition for preparing the printing layer may be formed on a separate transfer substrate using a method such as silk screen coating.

According to another embodiment of the present invention, a method for forming a printing layer on a cover window for touch screen panel includes:

(a) forming the printing layer by applying ink onto a transfer substrate film;

(b) forming a transfer film by forming an adhesive film layer on the upper portion of the transfer substrate film such that the printing layer is buried;

(c) removing a predetermined area of the transfer film to form a view area;

(d) attaching the transfer film to the cover window substrate such that the transfer film contacts the adhesive film layer; and (e) removing the transfer substrate film, transferring the printing layer to the cover window substrate through a medium of the adhesive film layer, and fabricating the cover window for touch screen panel by attaching the printing layer to the cover window substrate through a medium of the adhesive film layer while defining a view area.

Using this method, a cover window for touch screen panel provided with the aforementioned printing layer may be fabricated.

FIGS. 1 to 6 are schematic diagrams illustrating the respective steps of the aforementioned method. Each figure shows the cross section of a film lamination structure formed in each step.

In step (a) of FIG. 1, ink is applied onto a transfer substrate film 1 to form a printing layer 2.

Figure 2:
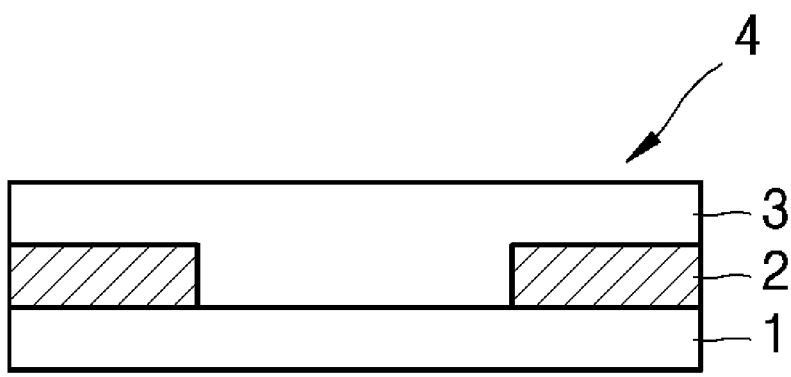

In step (b) of FIG. 2, a transfer film 4 is formed by forming an adhesive film layer 3 on an upper portion of the transfer substrate film 1 such that the printing layer 2 is buried.

Figure 3:
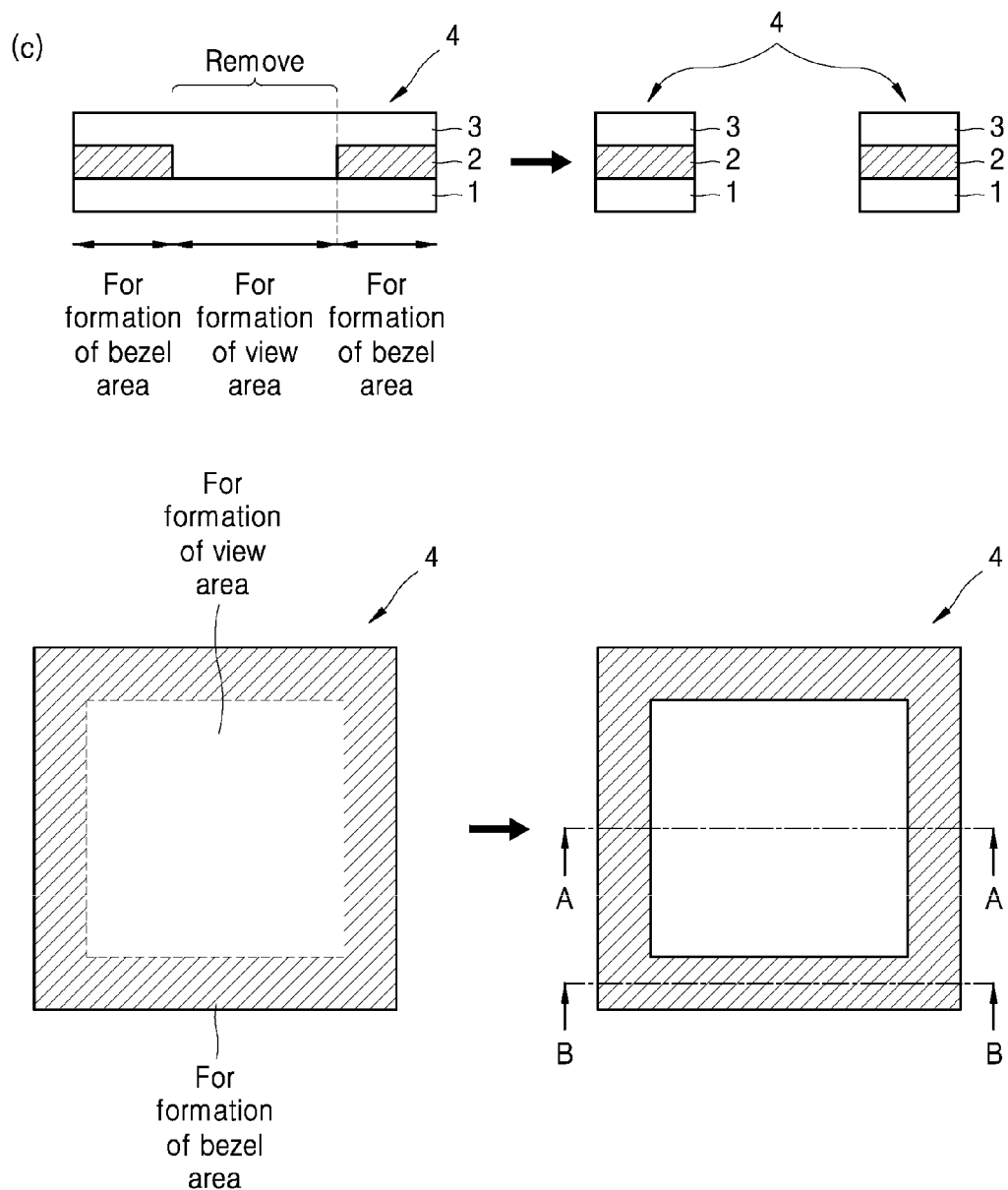

In step (c) of FIG. 3, a certain area of the transfer film 4 is removed to form a view area.

In FIG. 3, the dotted line represents a cutting line for removing a portion of the transfer film which is to be removed to define the view area. The cross section of the transfer film 4 with the portion removed to define the view area is shown on the right side of the arrow.

A plan view of the transfer film 4 is shown at the bottom in FIG. 3. The cross-sectional view taken along line A-A is shown on the upper portion of FIG. 3. As shown in the plan view, the printing layer 2 is formed at the edge of the transfer substrate film 1, and an area of the transfer substrate film 1 where the printing layer 2 is not formed is removed to define a view area in a cover window substrate 11 in step (d), which will be described later. If an area of the transfer film 1 to be removed from the transfer film 1 is predesigned and removed before the printing layer is formed, cost for unnecessarily forming the printing layer, which is finally to be removed may be saved. The area to be removed from the transfer film 4 may be predesigned and removed including an area where the printing layer is not formed.

Figure 4:
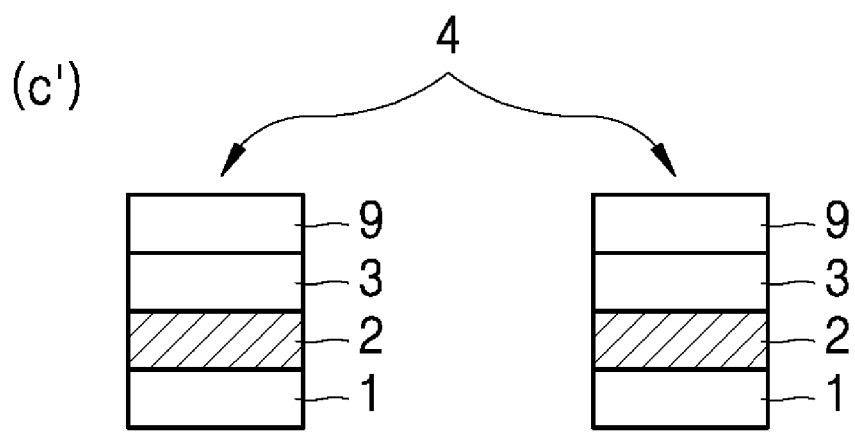

Referring to FIG. 4 which illustrates step (c'), a release film layer 9 may be formed on the upper portion of the adhesive film layer 3 of the transfer film 4 to protect the adhesive film layer 3 from foreign substances until the adhesive film layer 3 is attached in step (d).

Figure 5:
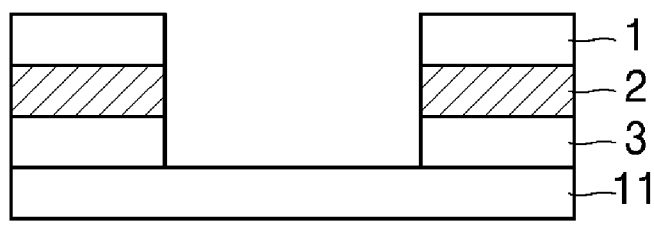
Figure 5:
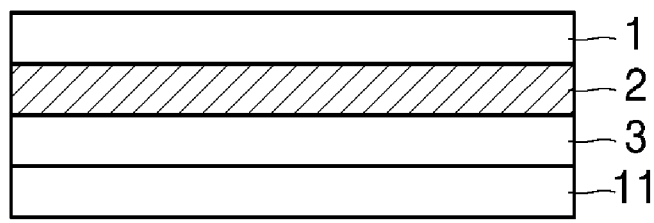

In step (d) of FIG. 5, the transfer film 4 is attached to the cover window substrate 11 such that the adhesive film layer 3 contacts the cover window substrate 11 thereabove. If there is a release film layer formed in step (c'), the release film layer 9 is removed shortly before the attachment of step (d), and then the transfer film 4 is attached to the cover window substrate 11 thereabove.

A cross-sectional view corresponding to the cross-section taken along line B-B indicated in the plan view of the transfer film 4 of step (d) is shown at the lower portion of FIG. 5.

Figure 6:
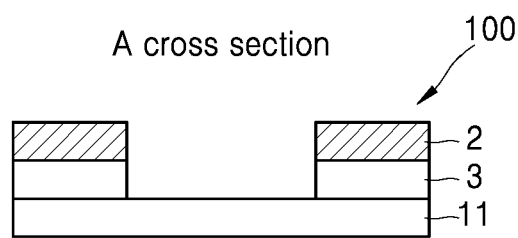
Figure 6:
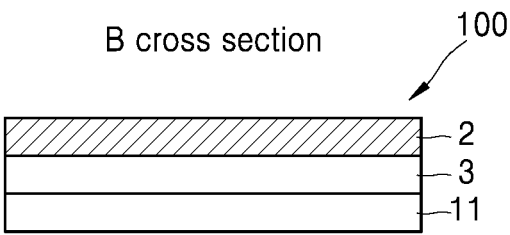
Figure 6:
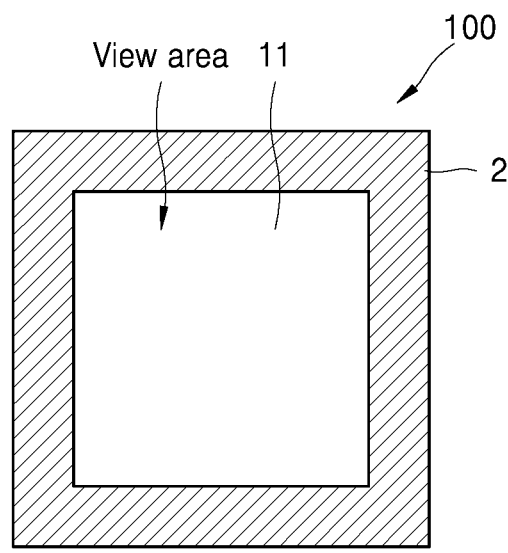

In step (e) of FIG. 6, the transfer substrate film 1 is removed, and the printing layer 2 is transferred to the cover window substrate 11 through a medium of the adhesive film layer 3. The printing layer may be transferred using a method, which can be employed in a conventional film transfer process.

As a result, a cover window for touch screen panel 100 is obtained with the printing layer 2 attached to the cover window substrate 11 through a medium of the adhesive film layer 3 while the cover windows substrate 11 defines a view area.

The lower portion of FIG. 6 is a cross-sectional view corresponding to the cross-section taken along line B-B indicated in the plan view of the transfer film 4 of step (c).

Preferred embodiments of the present invention have been described above. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF REFERENCE NUMBERS

1. Transfer substrate film
2. Printing layer
3. Adhesive film layer
4. Transfer film
9. Release film layer
11. Cover window substrate
100. Cover window formed with a printing layer for a touch screen panel

The invention claimed is:

1. A method for forming a printing layer on a cover window for a touch screen panel, the method comprising:
   applying ink onto a transfer substrate film to form the printing layer;
   thereafter forming a transfer film by forming an adhesive film layer on an upper portion of the transfer substrate film such that the printing layer is buried;
   removing a predetermined area of the transfer film to define a view area;
   attaching the transfer film to a cover window substrate such that the adhesive film layer contacts the cover window substrate thereabove; and
   removing the transfer substrate film, transferring the printing layer to the cover window substrate through a medium of the adhesive film layer, and fabricating the cover window for touch screen panel by attaching the printing layer to the cover window substrate through a medium of the adhesive film layer while defining the view area.

2. The method for forming a printing layer on a cover window for a touch screen panel according to claim 1, wherein a release film layer is formed on an upper portion of the adhesive film layer to protect the adhesive film layer, and the transfer film is attached after the release film layer is removed shortly before attaching the adhesive film layer to be in contact with the cover window substrate thereabove.

3. The method for forming a printing layer on a cover window for a touch screen panel according to claim 1, wherein the printing layer is formed at an edge of the transfer substrate film, and an area where the printing layer is not formed is removed from the transfer film, which forms a view area in the cover window substrate.

4. The method for forming a printing layer on a cover window for a touch screen panel according to claim 1,
   wherein the adhesive film layer has a thickness enforcing adhesive force which enables transfer of the printing layer by making adhesiveness between the adhesive film layer and the cover window substrate higher than adhesiveness between another separately prepared substrate and the printing layer, and the adhesive film layer is formed on the printing layer formed on the another separately prepared substrate and transferred,
   wherein a thickness of the adhesive film layer is in a range of 10 μm to 100 μm, and
   wherein a thickness of the printing layer is in a range of 5 μm to 75 μm.

5. The method for forming a printing layer on a cover window for a touch screen panel according to claim 1, wherein the step of applying ink onto the transfer substrate film to form the printing layer includes forming an aperture area in the printing layer.

6. The method for forming printing layer on a cover window for a touch screen panel according to claim 1, wherein a thickness of the adhesive film layer is 100 to 500% of a thickness of the printing layer.

\* \* \* \* \*